(12) United States Patent
Wang et al.

(10) Patent No.: US 8,972,743 B2
(45) Date of Patent: Mar. 3, 2015

(54) COMPUTER SECURITY SYSTEM AND METHOD

(75) Inventors: Lan Wang, Cypress, TX (US); Jennifer Rios, City Spring, TX (US); Valiuddin Ali, Houston, TX (US); Boris Balacheff, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1953 days.

(21) Appl. No.: 11/130,057

(22) Filed: May 16, 2005

(65) Prior Publication Data

US 2006/0259782 A1 Nov. 16, 2006

(51) Int. Cl.
*H04L 29/06* (2006.01)
*G06F 21/62* (2013.01)

(52) U.S. Cl.
CPC ............ *G06F 21/62* (2013.01); *G06F 21/6245* (2013.01); *G06F 2221/2117* (2013.01); *G06F 2221/2153* (2013.01)
USPC ........... 713/189; 713/183; 713/184; 713/193; 713/194; 726/30

(58) Field of Classification Search
USPC .................. 726/1–36; 713/161–176, 182–193
See application file for complete search history.

(56) References Cited

U.S. PATENT DOCUMENTS

| | | | |
|---|---|---|---|
| 5,841,869 A | 11/1998 | Merkling et al. | |
| 6,401,208 B2 | 6/2002 | Davis et al. | |
| 6,427,140 B1 | 7/2002 | Ginter et al. | |
| 6,438,594 B1 | 8/2002 | Bowman-Amuah | |
| 6,484,257 B1 | 11/2002 | Ellis | |
| 6,505,300 B2 | 1/2003 | Chan et al. | |
| 6,546,454 B1 | 4/2003 | Levy et al. | |
| 6,546,489 B1 | 4/2003 | Frank, Jr. et al. | |
| 6,557,104 B2 | 4/2003 | Vu et al. | |
| 6,618,810 B1 | 9/2003 | Dirie | |
| 6,625,730 B1 | 9/2003 | Angelo et al. | |
| 6,636,973 B1 | 10/2003 | Novoa et al. | |
| 6,871,278 B1 * | 3/2005 | Sciupac | 713/185 |
| 7,200,861 B2 * | 4/2007 | Alperin et al. | 726/2 |
| 7,421,588 B2 * | 9/2008 | Challener et al. | 713/193 |
| 2002/0087877 A1 | 7/2002 | Grawrock | |
| 2003/0037246 A1 * | 2/2003 | Goodman et al. | 713/191 |
| 2003/0084285 A1 | 5/2003 | Cromer et al. | |
| 2003/0120918 A1 * | 6/2003 | VanDer Kamp | 713/164 |
| 2003/0133575 A1 | 7/2003 | Challener | |
| 2003/0159056 A1 | 8/2003 | Cromer et al. | |

(Continued)

FOREIGN PATENT DOCUMENTS

| | | |
|---|---|---|
| EP | 1 107 627 A1 | 6/2001 |
| EP | 1 469 692 A2 | 10/2004 |

(Continued)

OTHER PUBLICATIONS

"TPM Main Part 3 Commands", Feb. 2005, version 1.2, 215 pages.*

(Continued)

*Primary Examiner* — David Pearson
*Assistant Examiner* — Thaddeus Plecha
(74) *Attorney, Agent, or Firm* — Michael A. Dryja

(57) ABSTRACT

A computer security system comprises a secure platform adapted to receive sensitive data from an agent. The secure platform is also adapted to cooperate with a trusted platform module (TPM) to encrypt the sensitive data via a TPM storage key associated with the agent.

24 Claims, 4 Drawing Sheets

(56) References Cited

U.S. PATENT DOCUMENTS

| | | | |
|---|---|---|---|
| 2003/0221114 A1 | 11/2003 | Hino et al. | |
| 2004/0003288 A1 | 1/2004 | Wiseman et al. | |
| 2004/0151319 A1 | 8/2004 | Proudler | |
| 2005/0182952 A1* | 8/2005 | Shinozaki | 713/189 |
| 2005/0251857 A1* | 11/2005 | Schunter et al. | 726/16 |
| 2006/0041932 A1* | 2/2006 | Cromer et al. | 726/6 |
| 2006/0112420 A1* | 5/2006 | Challener et al. | 726/5 |
| 2006/0129824 A1* | 6/2006 | Hoff et al. | 713/176 |

FOREIGN PATENT DOCUMENTS

| | | |
|---|---|---|
| JP | 2003249927 | 9/2003 |
| JP | 2003271254 | 9/2003 |
| JP | 2004336719 | 11/2004 |
| WO | WO2004/034238 | 4/2004 |

OTHER PUBLICATIONS

Chinese Patent Office Action from co-pending Chinese Patent Application No. 200680017008.2 having a mailed date of Jan. 16, 2009.
Translation of Office Action from German Patent Office, Mail Date May 29, 2009.
Japanese Office Action dated Jun. 16, 2010, pp. 4.
Translation of Japanese Office Action dated Jun. 16, 2010. pp. 4.
DE Office Action dated Mar. 2, 2010, pp. 2.
DE Office Action dated Nov. 4, 2010, appln No. 112006001151.0, pp. 2.
Translation of DE Office Action dated Nov. 4, 2010, appln. No. 112006001151.0, pp. 2.

* cited by examiner

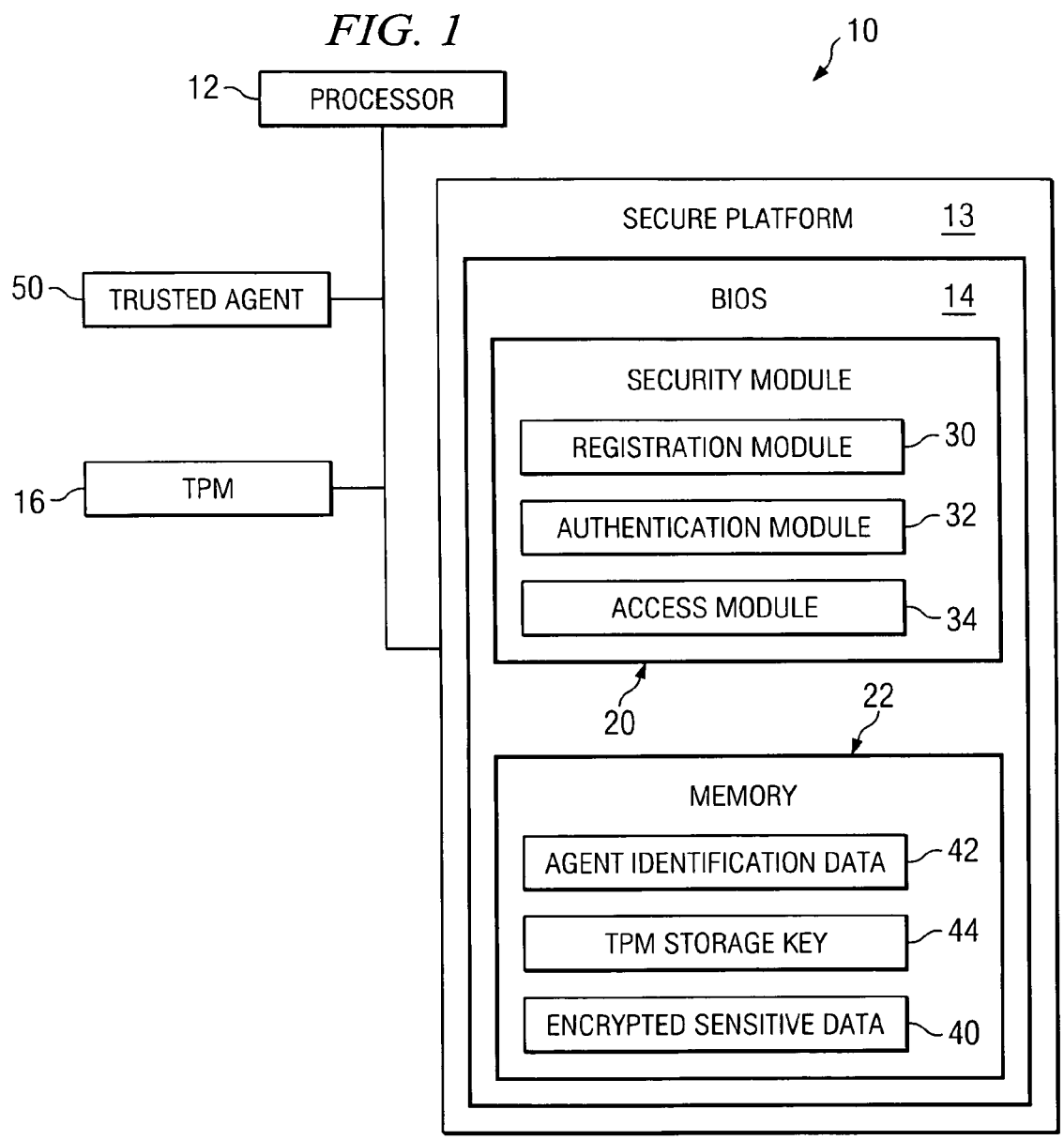

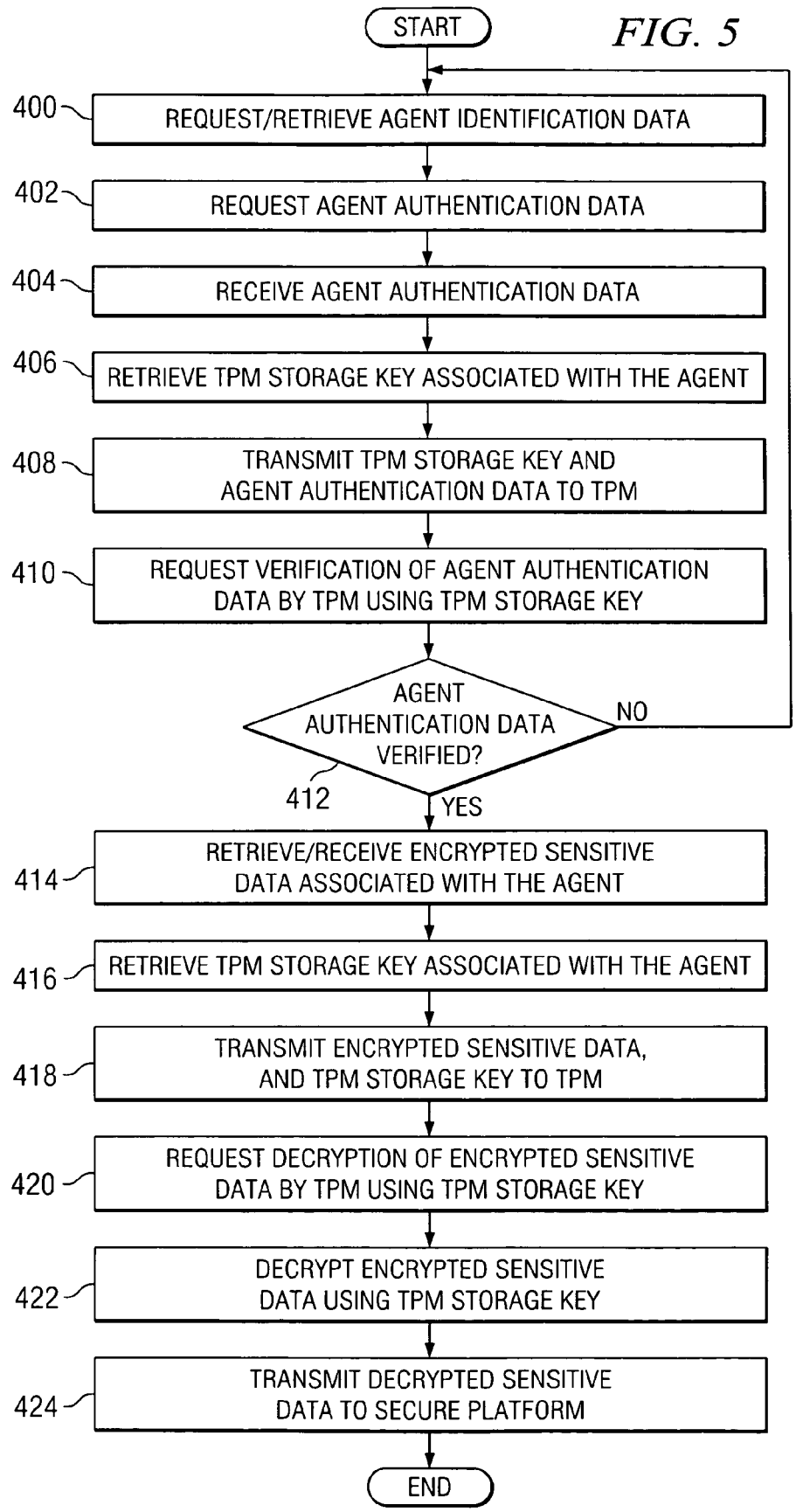

COMPUTER SECURITY SYSTEM AND METHOD

BACKGROUND

Various types of sensitive information are generally stored on a computer system such as, but not limited to, passwords, personal information, authentication mechanisms and data, and various types of computer system access credentials. The sensitive information may be user-generated, software-generated, stored on the computer system at the factory, or otherwise generated and stored on the computer system. However, at least because there are generally multiple users and/or agents accessing or utilizing a particular computer system, the sensitive information and/or security information used to protect such information or authenticate a user and/or agent requesting access to the sensitive information generally remains susceptible to hacking and/or discovery by unapproved or unauthenticated entities. Thus, there is a need to securely store such types of sensitive information on the computer system.

BRIEF DESCRIPTION OF THE DRAWINGS

For a more complete understanding of the present invention and the advantages thereof, reference is now made to the following descriptions taken in connection with the accompanying drawings in which:

FIG. 1 is a diagram illustrating an embodiment of a computer security system in accordance with the present invention;

FIG. 5 is a flow diagram illustrating another embodiment of a computer security method in accordance with the present invention.

DETAILED DESCRIPTION OF THE DRAWINGS

Figure 2A:
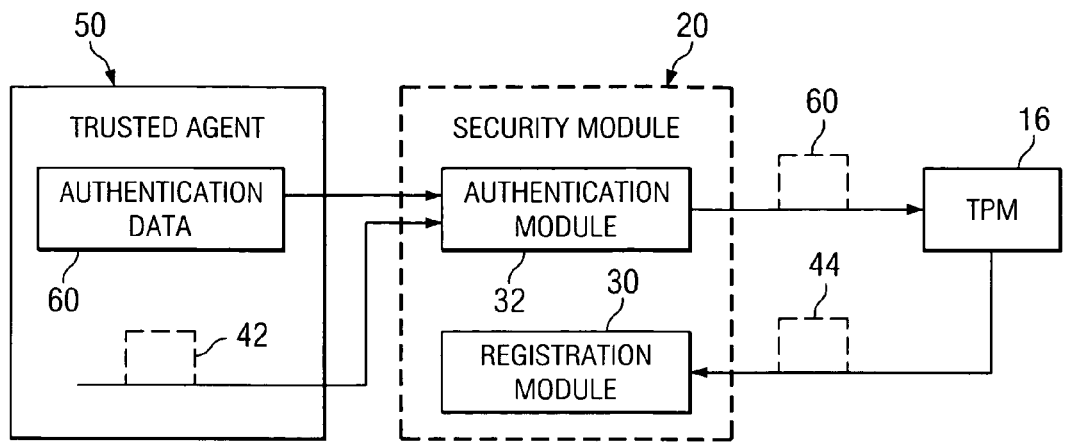
FIGS. 2A and 2B are diagrams illustrating example authentication and registration operations performed using the embodiment of the computer security system illustrated in FIG. 1.

The preferred embodiments of the present invention and the advantages thereof are best understood by referring to FIGS. 1-5 of the drawings, like numerals being used for like and corresponding parts of the various drawings.

FIG. 1 is a diagram illustrating an embodiment of a computer security system 10 in accordance with the present invention. In the embodiment illustrated in FIG. 1, system 10 comprises a processor 12 communicatively coupled to a secure platform 13. In the embodiment illustrated in FIG. 1, secure platform 13 comprises a basic input/output system (BIOS) 14. However, it should be understood that other systems, applications, modules or engines may be used as a secure platform including, but not limited to, an operating system (O/S) or a security software application. In the embodiment illustrated in FIG. 1, processor 12 and secure platform 13 are also communicatively coupled to a trusted platform module (TPM) 16.

In the embodiment illustrated in FIG. 1, BIOS 14 comprises a security module 20 and a memory 22. Security module 20 may comprise software, hardware, a combination of software and hardware. In operation of at least one embodiment of the present invention, security module 20 cooperates with TPM 16 to provide secure storage of sensitive information such as, but not limited to, platform and/or device-specific sensitive information (e.g., passwords, codes, and/or other types of sensitive information of which security is desired). In the embodiment illustrated in FIG. 1, security module 20 comprises a registration module 30, an authentication module 32 and an access module 34. Registration module 30 is used to receive sensitive information or data, cooperate with TPM 16 to encrypt the sensitive information, and store the encrypted sensitive information, identified as encrypted sensitive data 40, in memory 22. Authentication module 32 is used to authenticate or otherwise verify the identity of a source providing sensitive information to be protected or requesting access to the sensitive information. Access module 34 is used to cooperate with TPM 16 to decrypt the encrypted sensitive data 40 and provide or otherwise enable access to the decrypted sensitive information by a requesting entity. The sensitive information to be protected may comprise any type of information such as, but not limited to, information associated with initiating and/or accessing secure computer resources, a hard drive lock password, network access authorization information, and/or software application initiation or access passwords.

In the embodiment illustrated in FIG. 1, memory 22 also comprises agent identification data 42 and a TPM storage key 44. Agent identification data 42 comprises information associated with authenticating an identity of a trusted agent 50. Trusted agent 50 may comprise a user accessing system 10, a software application, such as a hard drive or disc encryption software application, or any other type of entity adapted to generate and/or provide sensitive information of which protection is desired and/or request access to secure or protected sensitive information. However, it should also be understood that sensitive information may be generated or otherwise provided by another entity (e.g., a password or code generated by BIOS 14). Thus, in operation, authentication of trusted agent 50 may be performed using any type of secure authentication method such as, but not limited to, a series of handshake signals, query/response exchanges, or password verification.

TPM storage key 44 is used by TPM 16 to encrypt the sensitive information for which security protection is desired. TPM storage key 44 comprises information generated and/or interpretable by TPM 16, such as an opaque binary large object (BLOB). In some embodiments of the present invention, TPM storage key 44 is associated with trusted agent 50. For example, in a user-based embodiment, TPM storage key 44 is generated by TPM 16 based on authentication of a particular user (e.g., based on a TPM 16 password or access credential provided by the particular user). In other embodiments, TPM storage key 44 is associated with a particular software application or computer-based system such that TPM storage key 44 is generated by TPM 16 based on authentication of a particular software application or computer-based system. In yet other embodiments of the present invention, TPM storage key 44 is associated with secure platform 13 (e.g., BIOS 14). In such an embodiment of the present invention, TPM storage key 44 is generated by TPM 16 based on authentication of secure platform 13 (e.g., via a TPM 16 password or credential provided by BIOS 14).

Figure 2B:
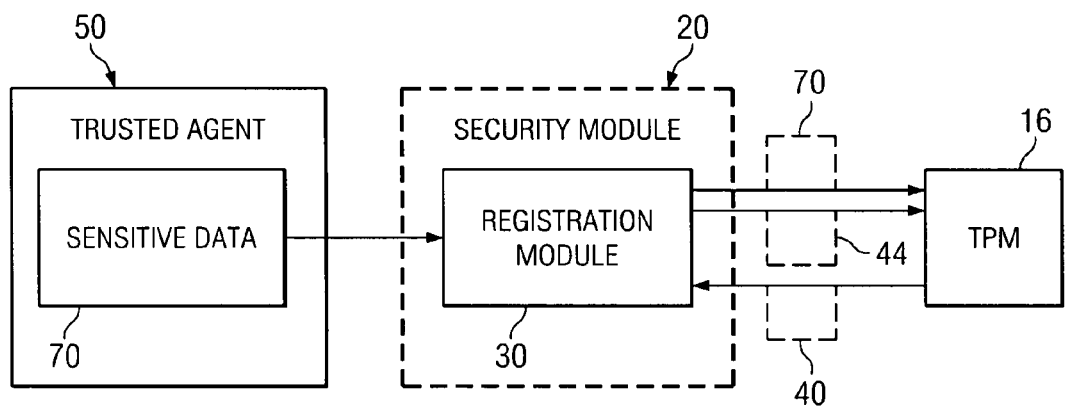

FIGS. 2A and 2B are diagrams illustrating an embodiment of authentication and registration operations using system 10 in accordance with the present invention. In some embodiments of the present invention, the authentication and registration operations are performed for trusted agent 50 (e.g., a user of system 10 or a software application). However, it should be understood that the authentication and registration operations may be performed for other types of computer resource applications or systems (e.g., authentication and registration of BIOS-generated sensitive information). Referring to FIG. 2A, in operation, authentication module 32 performs an authentication operation by requesting or otherwise acquiring agent identification data 42 and authentication data 60 from trusted agent 50. For example, agent identification data 42 comprises information corresponding to an identity of trusted agent 50 such as, but not limited to, a username or device serial number. Authentication data 60 comprises information associated with at least accessing and/or utilizing TPM 16 and/or otherwise verifying an identity of the agent 50 attempting to access or otherwise utilize TPM 16, such as, but not limited to, a TPM password or biometric. The authentication process may be performed for a single agent 50 or multiple agents 50 (i.e., such as multiple users in a shared computing environment and/or multiple software applications or systems).

In the embodiment illustrated in FIG. 2A, authentication module 32 verifies or otherwise authenticates the identity of agent 50 by verifying and/or otherwise authenticating agent identification data 42 and/or authentication data 60 associated with the trusted agent 50 (e.g., by comparing and/or correlating received agent identification data 42 and/or authentication data 60 with known or stored data and/or values). Authentication module 32 also performs at least a first stage of the registration operation. For example, in operation, authentication module 32 transmits authentication data 60 associated with agent 50 to TPM 16, and requests generation by TPM 16 of TPM storage key 44 based on authentication data 60. Registration module 30 receives and stores TPM storage key 44 (e.g., in memory 22 of BIOS 14). However, it should also be understood that, after authentication of agent 50 by authentication module 32, control of the registration operation may be passed from authentication module 32 to registration module 30 to request generation by TPM 16 of TPM storage key 44. For example, in this embodiment, registration module 30 receives authentication data 60 associated with agent 50 from agent 50 and/or authentication module 32 and transmits authentication data 60 associated with agent 50 to TPM 16, and requests generation by TPM 16 of TPM storage key 44 based on authentication data 60.

Referring to FIG. 2B, registration module 30 performs a second stage of a registration operation to acquire sensitive data 70. Sensitive data 70 comprises any type of information in which security is of a concern or which security is to be maintained such as, but not limited to, equipment or device passwords (e.g., a hard drive lock password) and access credentials (e.g., network and/or software application access credentials). However, it should also be understood that sensitive data 70 may be acquired from agent 50 during an earlier stage of the registration operation.

In the second stage of the registration operation, registration module 30 transmits TPM storage key 44 and sensitive data 70 to TPM 16 and requests TPM 16 to encrypt sensitive data 70 using TPM storage key 44. For example, in some embodiments of the present invention, TPM storage key(s) 44 are not stored by TPM 16 to further prevent access to TPM storage key(s) 44 by hostile sources. TPM 16 encrypts sensitive data 70 using TPM storage key 44, thereby forming encrypted sensitive data 40, and transmits encrypted sensitive data 40 to registration module 30. In some embodiments of the present invention, registration model 30 then stores, or causes to be stored, in memory 22 encrypted sensitive data 40. However, in other embodiments of the present invention, encrypted sensitive data 40 may be transmitted to another entity for storage (e.g., agent 50). In the embodiment illustrated in FIGS. 2A and 2B, the registration operation is described in terms of multiple stages; however, it should be understood that the registration operation of FIGS. 2A and 2B may also be considered to be performed in a single stage.

Figure 3:
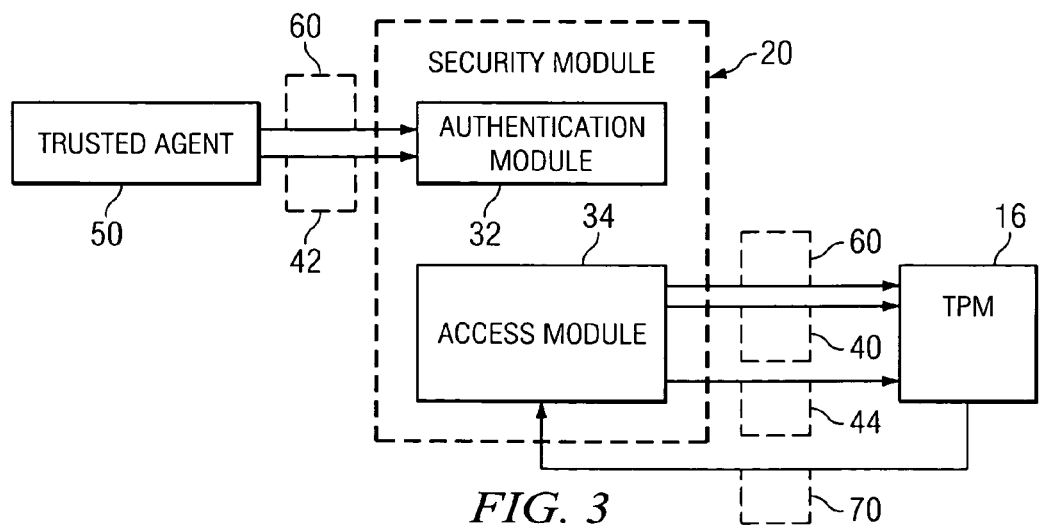
FIG. 3 is a diagram illustrating an example of a secure information access operation performed using the embodiment of the computer security system illustrated in FIG. 1.

FIG. 3 is a diagram illustrating a sensitive information access operation using system 10. In operation, during the access process, security module 20 requests or otherwise receives from agent 50 information for authenticating an identity of agent 50 requesting access to the sensitive information (e.g., at least when access to sensitive information is not temporal with a process in which the identity of agent has been previously authenticated or as otherwise designated by security policies). For example, in operation, authentication module 32 receives or otherwise acquires from agent 50 authentication data 60 and agent identification data 42. Where agent 50 comprises a user of system 10 (e.g., a person), system 10 may be configured to request identification data 42 from the user or access stored identification data 42 and display available identification data 42 to the user to enable selection by the user (e.g., via an input/output device) of particular identification data 42.

After authentication of agent 50, security module 20 performs or otherwise requests decryption of encrypted sensitive data 40. For example, in operation for some embodiments of the present invention, access module 34 identifies and/or otherwise retrieves TPM storage key 44 and encrypted sensitive data 40 corresponding to the agent 50 based on the agent identification data 42. However, it should be understood that in other embodiments of the present invention, agent 50 may provide the encrypted sensitive data 40 to access module 34 during the access operation. Access module 34 transmits TPM storage key 44, authentication data 60 and encrypted sensitive data 40 to TPM 16 and requests verification or authentication of authentication data 60 and decryption of encrypted sensitive data 40. For example, in some embodiments of the present invention, TPM 16 is instructed or requested to verify authentication data 60 using TPM storage key 44. In response to successful verification or authentication of authentication data 60, TPM 16 decrypts encrypted sensitive data 40 using TPM storage key 44 and transmits the decrypted sensitive data 70 to access module 34. Access module 34 may then transmit sensitive data 70 to particular devices or applications (e.g., agent 50 or another device, system or application) or otherwise use sensitive data 70 to perform or authorize a particular computer security function.

In the embodiment illustrated in FIGS. 2A, 2B and 3, system 10 is configured to protect sensitive data 70 provided or otherwise generated by agent 50 (e.g., a user, such as a person, a software application, or another type of computer system or application). However, it should also be understood that sensitive data 70 may be provided or otherwise generated by secure platform 13 (e.g., by BIOS 14). For example, in some embodiments of the present invention, BIOS 14 may be configured to generate sensitive data 70 (e.g., in response to a request from agent 50 or another computer or software application/system). Further, in some embodiments of the present invention, secure platform 13 is configured or otherwise performs operations as agent 50 (e.g., secure platform 13 obtaining a TPM storage key 44 associated therewith and/or otherwise requesting encryption of sensitive information and/or access to encrypted sensitive information via TPM storage key 44). In some embodiments of the present invention, BIOS 14, for example, is configured to generate sensitive data 70 (e.g., based on a request by agent 50 or another computer or software application/system). In such an embodiment of the present invention, BIOS 14 also communicates with and otherwise authenticates its identity with TPM 16 based on identification data and/or authentication data associated with BIOS 14. Thus, in this embodiment of the present invention, BIOS 14 authenticates its identity with TPM 16 (e.g., via handshake signals, query/response exchange(s), or another type of authentication method) and obtains from TPM 16 its own TPM storage key 44. The TPM storage key 44 associated with BIOS 14 is used to encrypt the sensitive data 70 generated or otherwise provided by BIOS 14 via TPM 16 and is also used to decrypt the resulting encrypted sensitive data 40. As discussed above, the encrypted sensitive data 40 may be stored in memory 22 of BIOS 14 or transmitted to a requesting entity (e.g., agent 50 or another computer software application or system).

Figure 4:
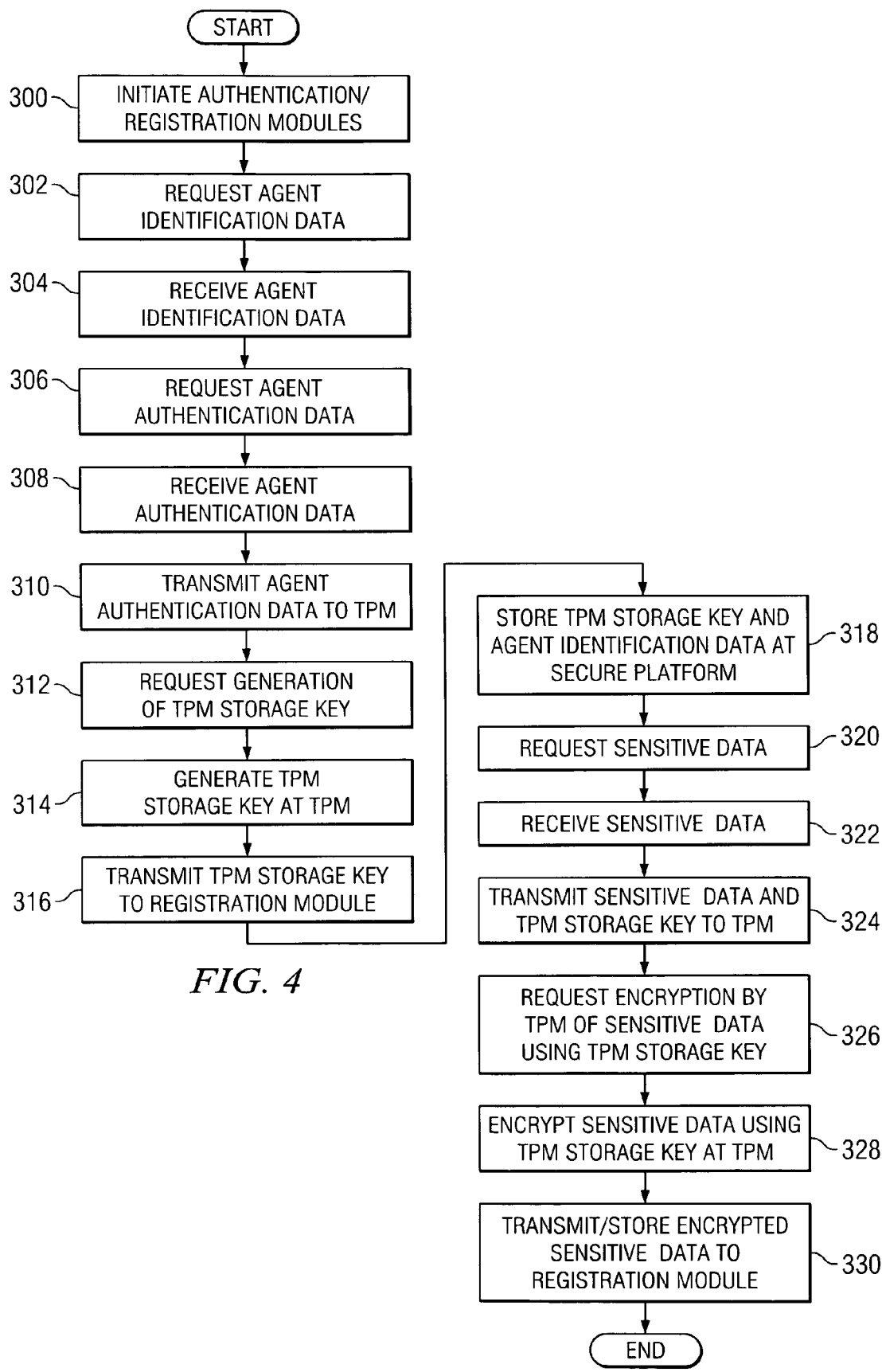
FIG. 4 is a flow diagram illustrating an embodiment of a computer security method in accordance with the present invention.

FIG. 4 is a flow diagram illustrating an embodiment of a computer security authentication and registration method using system 10 in accordance with the present invention. The method begins at block 300, where authentication module 32 and registration module 30 are initiated. At block 302, authentication module 32 requests agent identification data 42. At block 304, authentication module 32 receives agent identification data 42. At block 306, authentication module 32 requests authentication data 60 from agent 50. At block 308, authentication module 32 receives authentication data 60 from agent 50.

At block 310, authentication module 32 transmits authentication data 60 to TPM 16. At block 312, authentication module 32 requests generation of TPM storage key 44 based on authentication data 60 associated with agent 50. At block 314, TPM 16 generates TPM storage key 44. At block 316, registration module 30 receives TPM storage key 44 from TPM 16.

At block 318, TPM storage key 44 and agent identification data 42 are stored in memory 22. At block 320, registration module 30 requests sensitive data 70 from agent 50. However, it should be understood that in some embodiments or applications of the present invention, a request for sensitive data 70 may be unnecessary. At block 322, registration module 30 receives sensitive data 70 from agent 50. At block 324, registration module 30 transmits sensitive data 70 and TPM storage key 44 to TPM 16. At block 326, registration module 30 requests encryption by TPM 16 of sensitive data 70 using TPM storage key 44. At block 328, TPM 16 encrypts sensitive data 70 using TPM storage key 44, thereby generating encrypted sensitive data 40. At block 330, registration module 30 receives encrypted sensitive data 40 from TPM 16 and transmits and/or stores the encrypted sensitive data 40. For example, in some embodiments of the present invention, registration module 30 stores encrypted sensitive data 40 in memory 22. In other embodiments of the present invention, registration module 30 transmits encrypted sensitive data 40 to agent 50 or another designated system or application.

FIG. 5 is a flow diagram illustrating an embodiment of a computer security method for accessing protected information using system 10 in accordance with the present invention. The method begins at block 400, where access module 34 requests or retrieves agent identification data 42. For example, as described above, agent identification data 42 may be provided by agent 50 or retrieved from memory 22 for selection by agent 50 (e.g. a user of system 10). At block 402, access module 34 requests authentication data 60 from agent 50. At block 404, access module 34 receives authentication data 60 from agent 50.

At block 406, access module 34 retrieves TPM storage key 44 associated with agent 50 based on agent identification data 46. At block 408, access module 34 transmits TPM storage key 44 and authentication data 60 to TPM 16. At block 410, access module 34 requests verification or authentication of authentication data 60 by TPM 16 using TPM storage key 44. However, it should be understood that authentication module 32 may be used to perform an authentication operation to verify or otherwise authenticate the identity of agent 50.

At decisional block 412, a determination is made whether authentication data 60 is verified based on TPM storage key 44. If authentication data 60 is not verified or otherwise authenticated by TPM 16, the method returns to block 400. If authentication data 60 is verified or otherwise authenticated by TPM 16, the method proceeds to block 414, where access module 34 retrieves encrypted sensitive data 40 associated with or otherwise requested by agent 50 from memory 22. It should be understood that encrypted sensitive data 40 may also be provided by agent 50 (e.g., if the encrypted sensitive data 40 is not stored in memory 22 of secure platform 13). At block 416, access module 34 retrieves TPM storage key 44 associated with agent 50. At block 418, access module 34 transmits encrypted sensitive data 40 and TPM storage key 44 associated with agent 50 to TPM 16.

At block 420, access module 34 requests decryption of encrypted sensitive data 40 by TPM 16 using TPM storage key 44. At block 422, TPM 16 decrypts encrypted sensitive data 40 using TPM storage key 44. At block 424, TPM 16 transmits, or access module 34 otherwise receives, decrypted sensitive data 70. Access module 34 may then use decrypted sensitive data 70 to perform or otherwise access a secure computer application or operation or provide the decrypted sensitive data 70 to agent 50.

In the embodiment depicted in FIGS. 4 and 5, sensitive data 70 is generated or otherwise provided by agent 50. However, as described above, it should be understood that secure platform 13 (e.g., BIOS 14 or another type of trusted platform or system) may be used to generate and/or otherwise provide the sensitive data 70. For example, and not by way of limitation, in a drive-lock application, BIOS 14 may be used to generate a drive-lock password as the sensitive data 70. In this embodiment of the present invention, BIOS 14 may be used to cooperate with TPM 16 to encrypt the drive-lock password using a TPM storage key 44 associated with BIOS 14. The encrypted password may then be forwarded to the drive-lock mechanism for storage. Thus, when access to the drive is requested, the drive-lock mechanism requests access to the drive-lock password by forwarding the encrypted drive-lock password to access module 34, which, after authentication of the drive-lock mechanism, forwards the encrypted drive-lock password to TPM 16 with the TPM storage key 44 for decryption. After decryption, access module 34 forwards the decrypted drive-lock password to the drive-lock mechanism for unlocking the drive device. Thus, in this embodiment of the present invention, the decrypted drive-lock password is not stored on the system (e.g., only transiently available).

Thus, embodiments of the present invention enable secure storage of sensitive information using cryptographic properties of a trusted platform module (i.e., TPM 16). In some embodiments of the present invention, the sensitive information is provided or otherwise generated by a user of the system (e.g., a person), a computer or software application system, or by a secure platform also used to store an encrypted form of the sensitive information (e.g., BIOS 14).

It should be understood that in the methods described in FIGS. 4 and 5, certain functions may be omitted, combined, or accomplished in a sequence different than depicted in FIGS. 4 and 5. Also, it should be understood that the methods depicted in FIGS. 4 and 5 may be altered to encompass any of the other features or aspects described elsewhere in the specification.

What is claimed is:

1. A computer security system, comprising:
   a processor;
   a trusted platform module (TPM) comprising a circuit electrically connected to the processor;
   a secure platform to receive sensitive data from an agent and to request the trusted platform module (TPM) to encrypt the sensitive data via a TPM storage key associated with the agent, where the TPM storage key is generated by the TPM based in part on an authentication data previously received from the agent; and
   the secure platform being further configured to control access to the encrypted sensitive data by, in response to a request to access:
   receiving agent identification data and the authentication data from the agent requesting access;
   retrieving, from a memory, the TPM storage key associated with the agent identification data;
   passing the authentication data and the TPM storage key to the TPM, the TPM responsive to receiving the authentication data and the TPM storage key verifying the authentication data using the TPM storage key; and
   if verified, decrypting the sensitive data by the TPM using the TPM storage key to allow access to the sensitive data.

2. The system of claim 1, wherein the secure trusted platform comprises a basic input/output system (BIOS).

3. The system of claim 1, wherein the secure platform is adapted to cooperate with the TPM to decrypt the encrypted sensitive data using the TPM storage key.

4. The system of claim 1, wherein the secure platform is adapted to authenticate an identity of the agent.

5. The system of claim 1, wherein the secure platform is adapted to cooperate with the TPM to authenticate an identity of the agent.

6. The system of claim 1, wherein the secure platform is adapted to cooperate with the TPM to facilitate creation of the TPM storage key by the TPM for the agent using authentication data provided by the agent.

7. The system of claim 1, wherein the secure platform is implemented in a computer-readable medium.

8. The system of claim 1, wherein the agent comprises a software application.

9. The system of claim 1, wherein the secure platform is adapted to authenticate an identity of the agent before enabling subsequent access to the sensitive data by the agent.

10. The system of claim 1, wherein the secure platform is adapted to retrieve the TPM storage key associated with the agent in response to a request by the agent to access the sensitive data.

11. A computer security system, comprising:
   means for receiving sensitive data from an agent;
   means for cooperating with a trusted platform module (TPM) to encrypt the sensitive data via a TPM storage key generated using a first authentication data, the TPM storage key being associated with the agent, the means for cooperating being implemented in a computer-readable medium; and
   means for controlling access to the encrypted sensitive data by, in response to a request to access:
   receiving agent identification data and a second authentication data from the agent requesting access;
   retrieving, from a memory, the TPM storage key associated with the agent identification data;
   passing the second authentication data and the TPM storage key to the TPM, the TPM responsive to receiving the second authentication data and the TPM storage key verifying the second authentication data using the TPM storage key; and
   if verified, decrypting the sensitive data by the TPM using the TPM storage key to allow access to the sensitive data.

12. The system of claim 11, further comprising means for authenticating an identity of the agent.

13. The system of claim 11, further comprising means for storing the TPM storage key on a secure platform.

14. The system of claim 11, further comprising means for cooperating with the TPM to decrypt the encrypted sensitive data in response to a request by the agent to access the sensitive data.

15. The system of claim 11, further comprising means for cooperating with the TPM to enable creation of the TPM storage key by the TPM using the first authentication data provided by the agent.

16. A computer security method, comprising:
   receiving sensitive data from an agent;
   cooperating with a trusted platform module (TPM) to encrypt the sensitive data via a TPM storage key generated using a first authentication data, the TPM storage key being associated with the agent;
   controlling access to the encrypted sensitive data by, in response to a request to access:
   receiving agent identification data and a second authentication data from the agent requesting access;
   retrieving, from a memory, the TPM storage key associated with the agent identification data;
   passing the second authentication data and the TPM storage key to the TPM, the TPM responsive to receiving the second authentication data and the TPM storage key verifying the second authentication data using the TPM storage key; and
   if verified, decrypting the sensitive data by the TPM using the TPM storage key to allow access to the sensitive data.

17. The method of claim 16, further comprising storing the TPM storage key on a secure platform.

18. The method of claim 16, further comprising authenticating an identity of the agent.

19. The method of claim 16, wherein receiving sensitive data from an agent comprises receiving sensitive data from a software application.

20. The method of claim 16, further comprising authenticating an identity of the agent in response to a request by the agent to access the sensitive data.

21. The method of claim 16, further comprising generating the TPM storage key by the TPM based in part on the first authentication data provided by the agent.

22. The method of claim 16, wherein receiving sensitive data comprises receiving sensitive data at a basic input/output system (BIOS).

23. The method of claim 22, further comprising storing the TPM storage key in a memory of the BIOS.

24. The method of claim 16, wherein receiving sensitive data comprises receiving sensitive data at a basic input/output system (BIOS) from the agent.

* * * * *